Figures 1, 2:
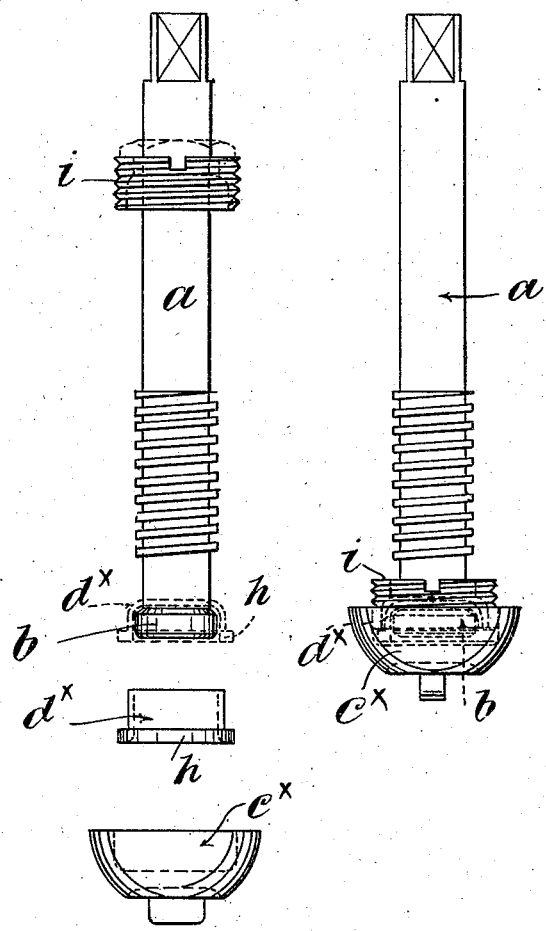

No. 784,996. PATENTED MAR. 14, 1905.
C. ELY.
MEANS FOR SECURING VALVES TO THEIR SPINDLES.
APPLICATION FILED FEB. 17, 1904.

Witnesses
Inventor
Clement Ely

No. 784,996. Patented March 14, 1905.

UNITED STATES PATENT OFFICE.

CLEMENT ELY, OF MANCHESTER, ENGLAND, ASSIGNOR TO ISAAC STOREY AND SONS LIMITED, OF MANCHESTER, ENGLAND.

MEANS FOR SECURING VALVES TO THEIR SPINDLES.

SPECIFICATION forming part of Letters Patent No. 784,996, dated March 14, 1905.

Application filed February 17, 1904. Serial No. 194,056.

*To all whom it may concern:*

Be it known that I, CLEMENT ELY, toolmaker, a subject of the King of Great Britain and Ireland, residing at 42 Harper street, Brooks's Bar, Manchester, in the county of Lancaster, England, have invented certain new and useful Improvements in Means for Securing Valves to Their Spindles, (for which I have made an application in Great Britain, No. 1,136, dated the 16th day of January, 1904,) of which the following is a specification.

This invention has reference to valves for controlling the flow of fluids, and relates particularly to screw down-valves, lift-valves, and other valves having a valve or clack connected to the valve-spindle. In valves of this description the valve or clack is usually connected to the spindle by means of a pin, wire, or staple engaging said valve or clack and the spindle or a collar formed on the latter. This is a somewhat costly form of connection and is not very effective, while the wire or staple is apt to collect deposit or to become worn.

My invention relates to a ready means for effecting a connection between the valve-spindle and the valve or clack and this without any drilling or boring and without the use of any loose fastenings.

According to my invention I form the valve-spindle with a collar or enlargement or with a suitably-shaped extremity, and in conjunction therewith I employ a valve secured to a part having a cylindrical extension. In connecting valve-spindle and said part carrying the cylindrical extension said extension is compressed or turned over or caused to engage the collar or extremity.

In order that my invention may be easily understood and for the purpose of ascertaining one or two practical applications of the idea, I will describe the invention in detail with reference to the annexed sheet of drawings.

In the said drawings, Figure 1 is a side elevation showing the parts separated, and Fig. 2 is a like view with the parts assembled.

Referring to the drawings, the ring or part $h$, formed with a tubular extension $d^\times$, is secured to the prepared extremity $b$ of the valve-spindle $a$ by compressing or turning over the tubular extension, causing spindle and ring or part to engage in the manner shown in dotted lines, Fig. 1. To this attached ring or part $h$ the valve is secured. In the structure shown the independent valve $c^\times$, which is suitably rounded or of other desired shape, is secured by means of a screwed union $i$. This screwed union may be passed down the spindle $a$ until it engages or rests on the attached ring or part $h$, the independent valve $c^\times$ being next screwed on said union $i$ so that the attached ring or part $h$ lies intermediate of said valve $c^\times$ and union $i$. The way of securing the separate valve to or around the ring or part $h$ may be obviously varied, I having above merely indicated one way in which the object may be accomplished.

An independent valve of the kind last described may be readily renewed or reground, attachment and detachment being readily effected, while the compressed tubular extension engaging the prepared spindle extremity gives a sort of ball-joint, allowing the valve to easily accommodate itself to the valve-seat.

Under my invention no loose fastenings are used and no drilling is necessary, while the connection is at once most effective and cheap.

I declare that what I claim is—

In the connection of valve-spindles to valves, a valve-spindle having an enlargement or prepared extremity, a loose ring or part having a tubular extension compressed or turned over around said extremity, a screwed union, and a non-integral valve, said union engaging said valve and securing same around the ring or part, substantially as described.

In witness whereof I have hereunto set my hand in presence of two witnesses.

CLEMENT ELY.

Witnesses:
 RICHARD IBBERSON,
 ALFRED YATES.